Nov. 4, 1969    J. B. SIMONS    3,476,156
SPRING ASSEMBLY AND MANUFACTURE THEREOF
Filed May 3, 1967    4 Sheets-Sheet 1

INVENTOR.
John B. Simons
BY
Barnard, McEwyn & Reising
ATTORNEYS.

Nov. 4, 1969
J. B. SIMONS
3,476,156
SPRING ASSEMBLY AND MANUFACTURE THEREOF
Filed May 8, 1967
4 Sheets-Sheet 2
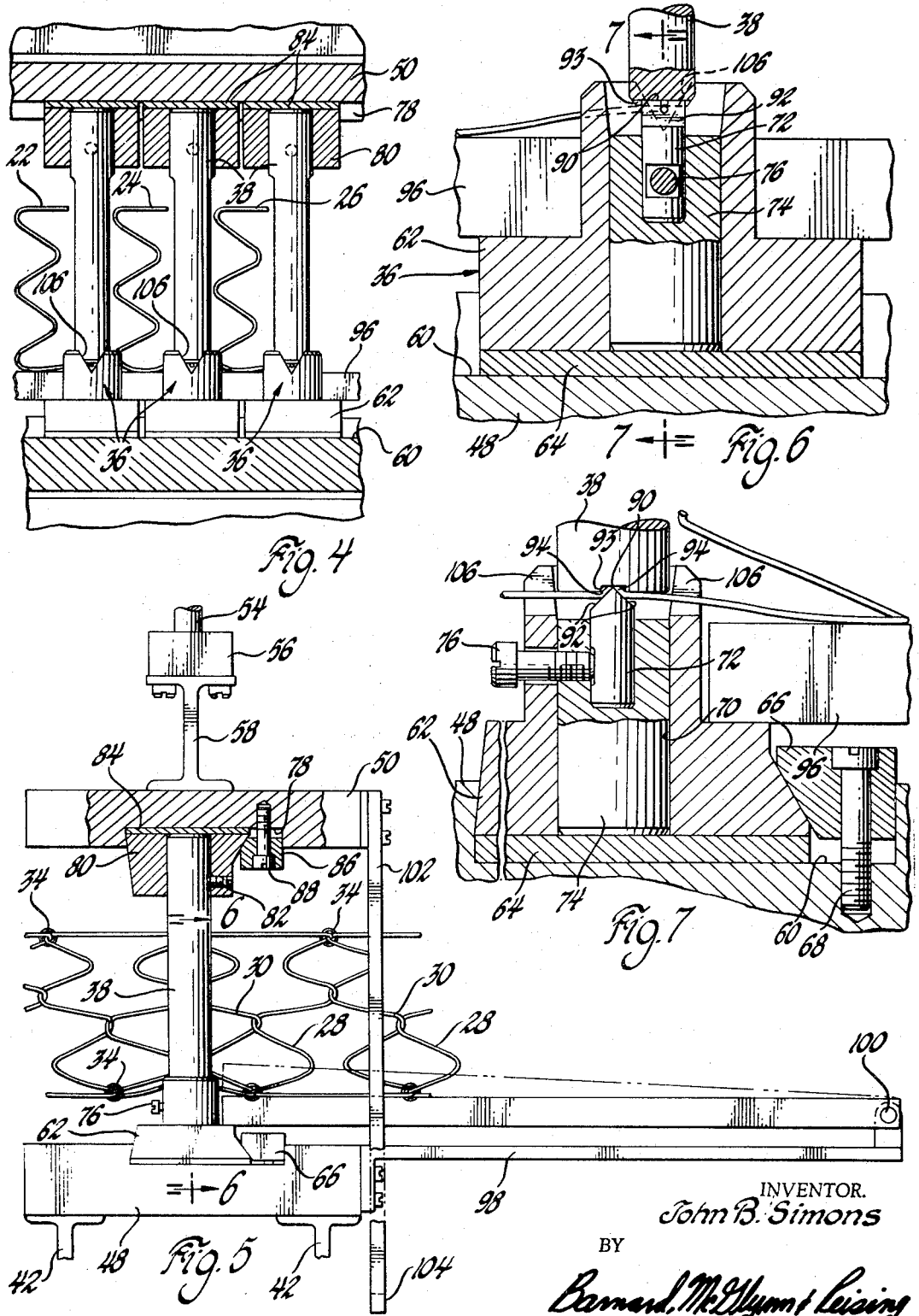
INVENTOR.
John B. Simons
BY
Barnard, McGlynn & Leising
ATTORNEYS Nov. 4, 1969   J. B. SIMONS   3,476,156
SPRING ASSEMBLY AND MANUFACTURE THEREOF
Filed May 3, 1967   4 Sheets-Sheet 3
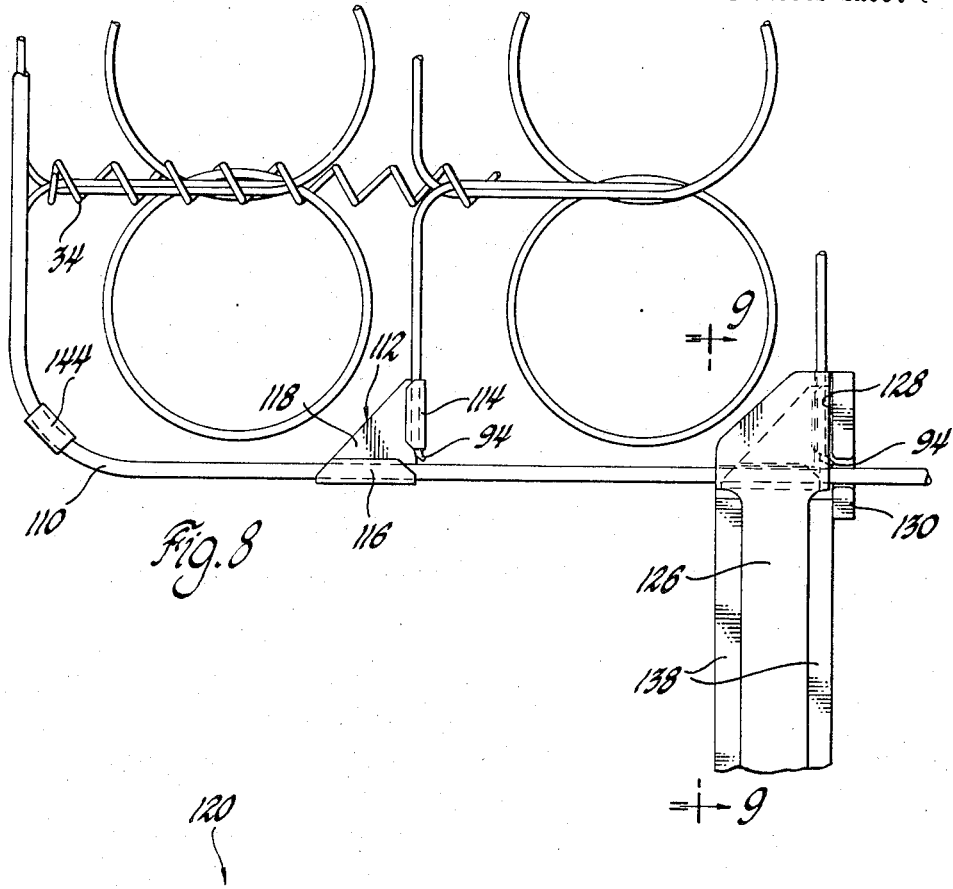
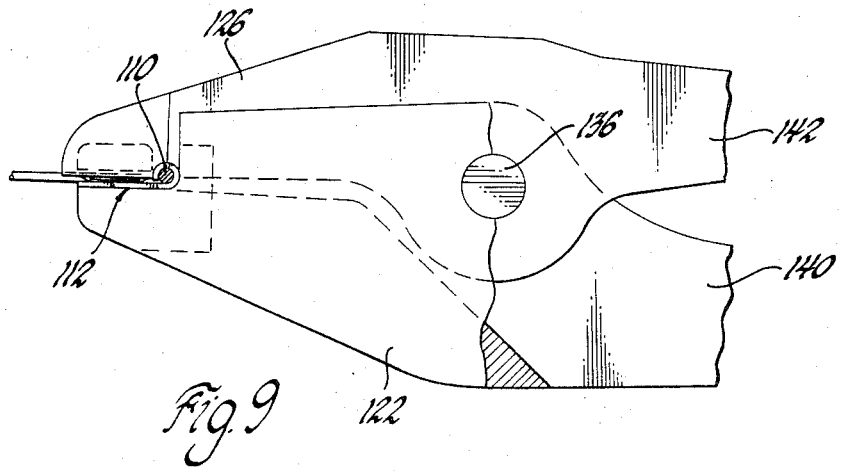
INVENTOR.
John B. Simons
BY
Barnard, McGlynn & Reising
ATTORNEYS Nov. 4, 1969  J. B. SIMONS  3,476,156
SPRING ASSEMBLY AND MANUFACTURE THEREOF
Filed May 8, 1967  4 Sheets-Sheet 4
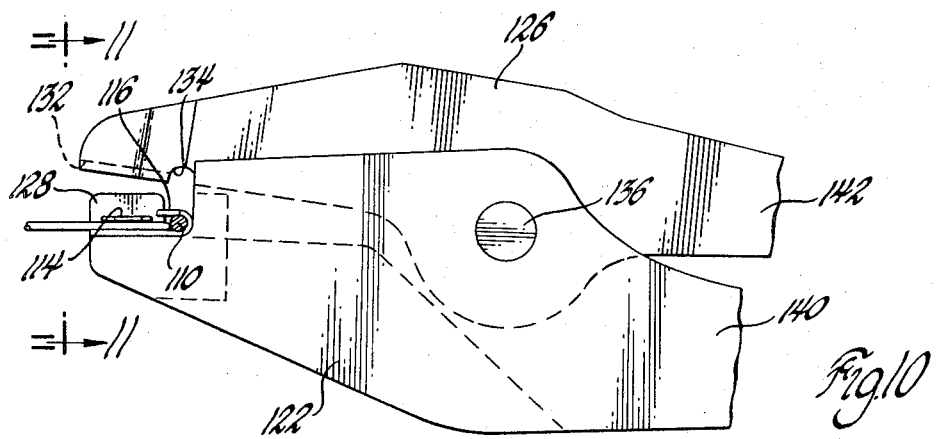
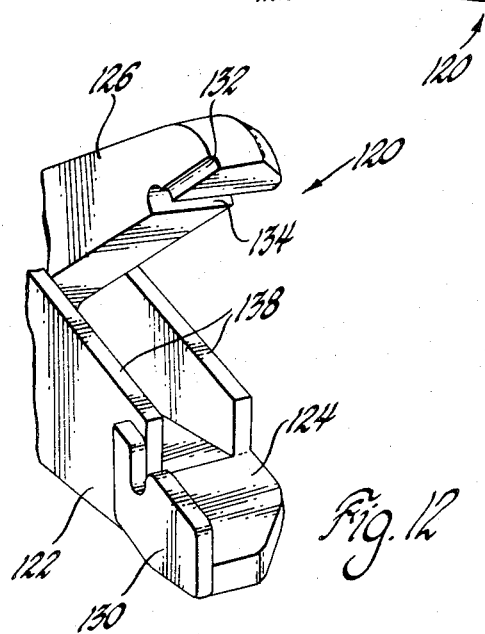
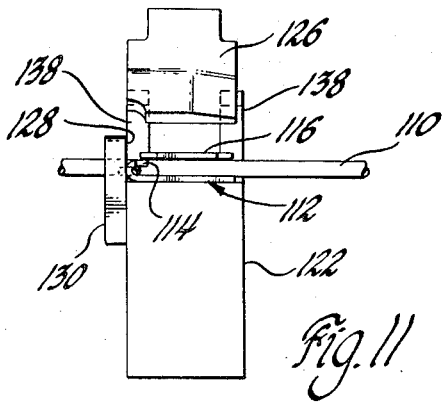
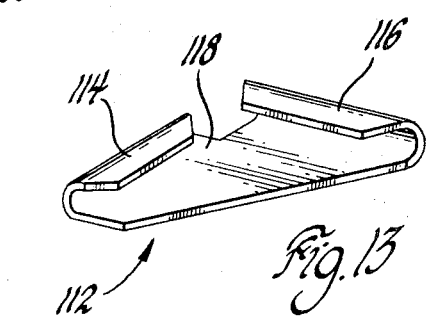
INVENTOR.
John B. Simons
BY
Barnard, McGlynn & Reising
ATTORNEYS

United States Patent Office 3,476,156
Patented Nov. 4, 1969

3,476,156
SPRING ASSEMBLY AND MANUFACTURE THEREOF
John B. Simons, Livonia, Mich., assignor to Lear Siegler, Inc., Santa Monica, Calif., a corporation of Delaware
Filed May 8, 1967, Ser. No. 636,750
Int. Cl. B21f 27/16
U.S. Cl. 140—3    4 Claims

ABSTRACT OF THE DISCLOSURE

A method and apparatus for manufacturing a spring assembly from a plurality of wires each of which defines a plurality of rows of integrally connected alternate left and right hand coils. The method involves disposing a plurality of the rows in parallel side-by-side relationship and cutting each wire of each row at spaced intervals to provide spring units while simultaneously bending each resulting end to form an angularly offset portion. Thereafter, a pair of spaced border frames are disposed about the spring units and a first portion of a clip is disposed in mechanical interlocking engagement with each wire adjacent the angularly offset portion thereof and a second portion of each clip is disposed in mechanical interlocking engagement with one of the border frames. To accomplish this, the invention features a wire handling machine having a plurality of anvil means, each of which defines at least one shear line for cutting the wire and an angularly disposed bending surface for simultaneously bending the resulting ends. An elongated member moves into and out of coacting relation with the anvil means and includes a recess for receiving the shear line of the anvil means for accomplishing the cutting and bending of a wire. The invention also features a device for wrapping a first U-shaped portion of an integral clip about a wire so as to be maintained thereon by the angularly offset portion while simultaneously wrapping a second U-shaped portion of the clip about an adjacent border frame. The device includes a first jaw for supporting a clip and a second jaw for moving into engagement and bending the U-shaped portions of such a clip about a wire element and a border frame respectively, the second jaw having first and second grooves therein for engaging the respective U-shaped portions of the clip for bending the latter. The result is, therefore, a unique spring assembly including a plurality of wires, each of which forms integrally interconnected alternate left and right hand coils. The adjacent coils of each row and adjacent rows are connected together by helical members. The ends of each wire which comprises each row of coils includes an angularly offet portion and a clip is disposed about the end thereof and is prevented from being removed from the end by the angularly offset portion and another portion of the clip is disposed in mechanical interlocking engagement with a border frame.

---

Spring assemblies of the type to which this application pertains are utilized in cushions, mattresses, bed springs, and the like. Until recently, the use of coil springs in such assemblies has been limited to individual coils connected together by independent wires, or the like. It is now possible to form from a single integral length of wire a row of alternately left and right hand coils integrally connected together with the respective coils being approximately parallel to one another. To accomplish this, a single integral wire is continuously formed into alternate left and right hand coils as disclosed in United States Patent 3,188,845. In order to make a usable spring assembly, however, it is necessary to divide such a continuous length or row of coils into separate spring units and to interconnect such spring units with each other and with a pair of spaced border frames disposed thereabout.

Accordingly, it is an object and feature of this invention to provide a novel spring assembly, a method of making such a spring assembly, and various apparatus related thereto and linked together by the novel method.

Another object and feature of this invention is to provide a method of manufacturing a spring assembly from at least one integral wire defining integrally connected alternate left and right hand coils by cutting the wire at spaced intervals and simultaneously bending the ends resulting therefrom to form an angularly offset portion at each end and thereafter positioning a pair of spaced border frames thereabout while disposing a first portion of a clip in mechanical interlocking engagement with each angularly offset end portion and disposing a second portion of each clip in mechanical interlocking engagement with one of the border frames.

A further object and feature of this invention is to provide a wire handling machine comprising anvil means and an elongated member for selectively coacting with the anvil means to simultaneously cut a wire and bend at least one of the ends resulting therefrom to form an angularly offset portion.

Yet another object and feature of this invention is to provide a wire handling machine including a plurality of anvil means disposed in side-by-side relationship and supported by a frame structure with support means disposed above the anvil means and vertically movable relative to the anvil means for supporting a plurality of the elongated members which may be moved into coacting relation with the respective anvil means for simultaneously cutting and bending a plurality of wires.

A still further object and feature of this invention is to provide a novel spring assembly including a plurality of coils with at least one border frame extending thereabout and a plurality of wires interconnecting the coils and having angularly offset ends positioned adjacent the border frame with a clip interconnecting each end and the border frame by including a first portion engaging a wire and a second portion in mechanical interlocking engagement with the border frame.

Another object and feature of this invention is to provide a novel integral clip including a first portion extending therealong and being generally U-shaped in cross section and a second portion extending therealong in a direction substantially at a right angle to the first portion and also being generally U-shaped in cross section whereby each U-shaped portion may be wrapped around a wire-like element for mechanically interconnecting two spaced wire-like elements.

A further object and feature of this invention is to provide a device of the type for securing first and second U-shaped portions of an integral clip about two respective wire-like elements for mechanically interconnecting the wire-like elements and comprising a first jaw for supporting a clip and a second jaw for moving into engagement and bending the U-shaped portions of such a clip about respective wire-like elements.

Other objects, features and attendant advantages of the present invention will be readily appreciated as the same becomes better understood by reference to the following detailed description when considered in connection with the accompanying drawings wherein:

FIGURE 4 is an enlarged fragmentary cross-sectional view of the embodiment illustrated in FIGURES 1 through 3;

FIGURE 5 is another enlarged fragmentary cross-sectional view of the preferred embodiment;

FIGURE 6 is an enlarged fragmentary cross-sectional view taken substantially along line 6—6 of FIGURE 5;

FIGURE 7 is an enlarged fragmentary cross-sectional view taken substantially along line 7—7 of FIGURE 6;

FIGURE 8 is a plan view of a preferred embodiment of the spring assembly of the instant invention and showing a fragmentary portion of a preferred embodiment of a device for securing a clip in position;

FIGURE 9 is a view taken substantially along line 9—9 of FIGURE 8 and shows the preferred embodiment of a device for securing a clip in position;

FIGURE 10 is a fragmentary view similar to FIGURE 9 but shows the jaws of the device in the open position;

FIGURE 11 is a view taken substantially along line 11—11 of FIGURE 10;

FIGURE 12 is a perspective view of the device illustrated in FIGURES 8 through 11; and FIGURE 13 is a perspective view of a preferred embodiment of the clip of the instant invention.

Figure 1:
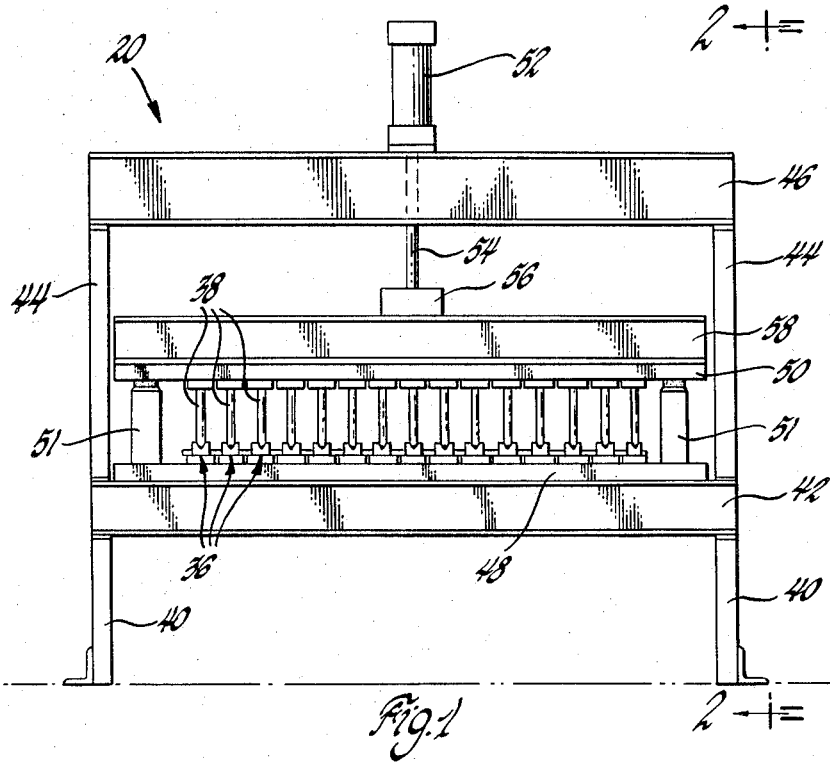
FIGURE 1 is an elevational view of a preferred embodiment of a wire handling machine of the instant invention.

Referring now to the drawings, wherein like numerals indicate like or corresponding parts throughout the several views, a wire handling machine is generally shown at 20. The wire handling machine 20 is especially adapted for receiving a plurality of rows of spring coils. Three such rows are respectively indicated at 22, 24 and 26 in FIGURE 4. One such row is shown in elevation in FIGURE 5. Each row is formed from an integral wire having integrally connected alternate left and right hand coils 28 and 30 as shown in FIGURE 5. A row of spring coils formed or defined by one integral wire may be made by a machine of the type disclosed in the above-mentioned U.S. Patent No. 3,188,845. As illustrated in FIGURE 5, adjacent coils are hooked together. The respective rows are schematically illustrated at 32 in FIGURE 2. Although only rows 22, 24 and 26 are illustrated in FIGURE 4, it will be evident from viewing FIGURE 1 that the wire handling machine 20 is adapted to receive numerous rows.

A plurality of rows are secured together by the helical members 34 as illustrated in FIGURES 5 and 8. The helical members 34 also interconnect adjacent coils in each row. The helical members 34 are rotated or screwed into place prior to the rows being moved into the wire handling machine 20.

The wire handling machine 20 includes a plurality of anvil means, each of which is generally indicated at 36. Also included are a plurality of press means, each of which comprises an elongated member 38. Each elongated member 38 selectively coacts with an anvil means 36 for simultaneously cutting a wire and bending at least one of the ends resulting therefrom, as is best illustrated in FIGURE 7.

More specifically, the wire handling machine 20 includes a frame structure comprising: the base members 40, beams 42, uprights 44, and beams 46. The frame structure also includes a table 48 which supports the plurality of anvil means 36, the anvil means 36 being disposed in side-by-side relationship with one another.

A support means 50 is disposed vertically above the anvil means 36 and is movable vertically relative thereto. The support means 50 supports the plurality of elongated members 38. There is also included an actuation means, which comprises the hydraulic cylinder 52 and piston 54, for selectively vertically moving the elongated members 38 between raised and lowered positions. The elongated members 38 are disposed above the upper extremities or tops of the rows of coil when in the raised position and are in a coacting relationship with the respective anvil means 36 when in the lowered position as illustrated for simultaneously cutting and bending respective wires. The cylinder 52 is secured to the beams 46 and the piston 54 is secured to the support means 50 through the block 56 and I-beam 58. The telescoping assemblies 51 maintain the support means 50 in alignment during vertical movement.

The table 48 has a first groove 60 extending therealong. A plurality of anvil support members 62 and shims 64 are disposed in the groove 60. A wedge block means 66 engages and maintains each anvil support member 62 in the groove 60. Each wedge block means 66 is forced into position by a bolt 68.

Each anvil support member 62 has a hole 70 therein and an anvil member 72 is supported in the hole 70 by the member 74. Both the member 74 and the anvil member 72 are held in position by the screw or bolt 76.

In a like manner, the support means 50 has a second groove 78 extending therealong and each elongated member 38 is disposed and retained in a hole in a holder member 80 by a set screw 82. A shim 84 may also be utilized if necessary. Each holder member 80 is maintained in the second groove 78 by a wedge block means 86 which is forced into position by a bolt 88.

Each anvil member 72 includes at least one shear line or linear edge 90 for cutting a wire as illustrated in FIGURES 6 and 7. Each anvil member 72 also includes the angularly disposed bending surfaces 92 against which a wire is forced by the elongated member 38 for bending thereof, as best illustrated in FIGURE 7. Each elongated member 38 is shaped to include a recess 93 to coact with the shear line or edge 90 and the bending surfaces 92 for simultaneously cutting and bending a wire as best illustrated in FIGURE 7. The resulting ends of the wires, therefore, include an angularly offset portion 94. It will be understood, of course, that the anvil members 72 and the elongated members 38 may have various different coacting shapes for simultaneously cutting and bending the wires to provide angularly offset portions. In other words, the elongated member 38 and the anvil member 72 may be shaped in various configurations to coact together so long as there is included at least one shear line or edge for cutting the wire and at least one angularly disposed bending surface against which a wire is forced by the associated elongated member for bending thereof.

There is also included a ramp means 96 for slidably supporting the respective rows of coils 32 as the latter are moved into position for cutting and bending thereof. The frame structure includes a cantilevered member 98 extending from the table 48. The cantilevered member pivotally supports the ramp means 96 at one end thereof as indicated at 100. Thus, the ramp means 96 is pivotally connected adjacent one end thereof to the frame structure so that the other end thereof is movable from a rest position, as illustrated in full lines in FIGURE 5, to a raised position, as illustrated in phantom in FIGURE 5. In the rest position, the ramp means 96 is disposed on the anvil support members 62 and when in the raised position is above the upper extremities of the anvil support members 62 for guiding the rows 32 of coils over the anvil support members 62 to prevent interference therebetween.

The ramp means is moved to the raised position by the lift means comprising the L-shaped member 102. The L-shaped member 102 depends from the support means 50 and engages the ramp means 96 as the support means 50 moves vertically upward when the piston 54 is retracted. In other words, the L-shaped member 102 raises the ramp means to the position illustrated in phantom in FIGURE 5 when the elongated members 38 are in the raised position so that the rows 32 of coils slide over the ramp means 96 and over the upper extremities of the respective anvil means 36. The elongated members 38 are shown in the cutting and bending position in FIGURES 4 and 5 and as will be noted the elongated members 38 extend downwardly between adjacent rows of coils; thus, in order for the rows of coil springs to move through the machine 20, the elongated members 38 must be moved to the raised position so that the lower extremities thereof are well above the upper extremities of the coils. The ramp 96, however, need only be moved up a small distance. Therefore, the L-shaped member 102 has a hook portion 104 which is well below the ramp means 96 when the elongated members 38 are in the lowermost position. Accordingly, the hook portion 104 does not engage the bottom of the ramp means 96 until the support means 50 has nearly reached the raised position.

There is also included guide means associated with each of the anvil means for guiding a wire of a spring unit onto the associated anvil member as the ramp means is lowered to the full line position illustrated in FIGURE 5. Such guide means comprises the V-shaped notches 106 in the anvil support member 62 on opposite sides of each of the anvil members 72. In other words, as the ramp means 96 is moved to the lowered position as illustrated in FIGURES 5 and 7, the wire of each row is guided into position on the respective anvil member by the V-shaped notches 106.

Figures 2, 3:
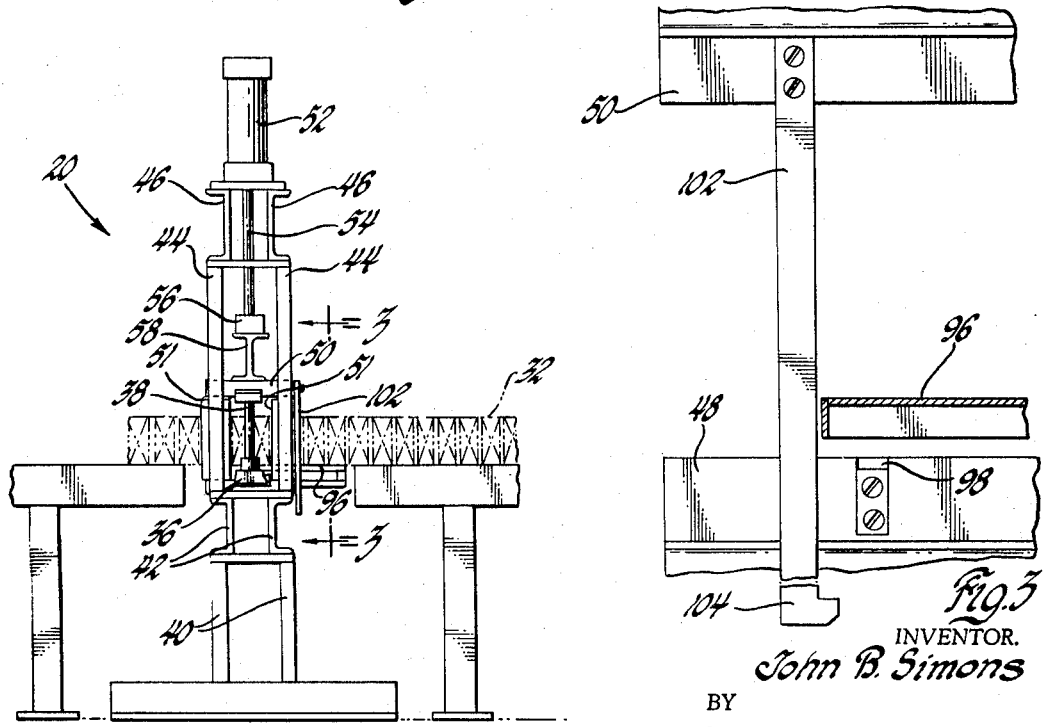
FIGURE 2 is an end view taken substantially along line 2—2 of FIGURE 1.
FIGURE 3 is an enlarged fragmentary cross-sectional view taken substantially along line 3—3 of FIGURE 2.

In the operation of the wire handling machine illustrated in FIGURES 1 through 7, a plurality of rows of integrally connected alternate right and left hand coils, which have been hooked together and secured together by helical members 34, are moved into the machine 20 as illustrated in FIGURE 2 while the elongated members 38 are in the raised position. Depending upon the length of the rows of coils to be cut, the heilcal members 34 are not included at spaced positions where each respective row is to be cut. The elimination of such helical members 34 allows the elongated members 38 to move down through the respective rows. When the respective elongated members 38 are in the raised position, the L-shaped member 102 has engaged the ramp means 96 and moved the ramp means 96 to the position illustrated in phantom in FIGURE 5. Thus, as the rows of springs are moved through the machine 20, they are guided over the respective anvil members 72 and anvil support members 62 by the ramp means 96. When the rows extend to the left of the machine the desired amount, as illustrated in FIGURE 2, the hydraulic cylinder 52 is actuated to move the piston 54 downwardly which in turn moves the respective elongated members 38 downwardly through and between the respective coils toward the respective anvil members 72. During the initial movement downward of the support means 50, the L-shaped member 102 allows the ramp means 96 to move to the lowered position illustrated in FIGURE 5 whereupon the wire of each row of coils is guided onto a respective anvil member 72 by the V-shaped notches 106. Thereafter, the elongated members 38 move into coacting relationship with the respective anvil members 72 to simultaneously cut and bend the integral wire of each row of coils.

In passing through the wire handling machine 20, each row of coils is divided into separate spring units, and a plurality of such units are disposed in parallel relationship and interconnected by the helical members 34. Thereafter, a pair of border frames 110 are disposed about a plurality of spring units to form a spring assembly. More specifically, a border frame 110 is disposed in a plane at one end of the respective coils and another border frame is disposed in a plane at the other end of the respective coils.

A clip, generally indicated at 112, is utilized to interconnect the integral wire of each row of coils and the border frames 110. The clip 112 includes a first portion 114 which extends therealong and is generally U-shaped in cross section and a second portion 116 which extends therealong in a direction substantially at a right angle to the first portion 114 and is also generally U-shaped in cross section. The second portion 116 is larger than the first portion 114. The clip 112 includes a generally triangularly shaped portion 118 which integrally connects the respective first and second portions 114 and 116. The first and second U-shaped portions 114 and 116 are spaced from one another as best illustrated in FIGURES 8 and 13.

The border frames 110 are positioned adjacent the wires as illustrated in FIGURE 8 and a clip 112 is positioned with the large U-shaped portion 116 disposed about the border frame and the small U-shaped portion 114 disposed about the integral wire of one of the rows of coils, the U-shaped portion 114 being disposed adjacent the angularly offset portion 94.

There is also included a device, generally shown at 120, for securing the clip 112 in position. The device 120 includes a first jaw 122 having a first surface 124 for supporting a clip 112 and a second jaw 126 for moving into engagement and bending the U-shaped portions 114 and 116 of the clip 112. More specifically, the first jaw 122 includes a second surface 128 defined by the plate 130 and extends substantially transversely to the first surface 124 for abutting and positioning a clip 112. The second jaw 126 includes first and second grooves 132 and 134 therein to engage the respective U-shaped portions 114 and 116 for bending or wrapping the latter about the border frame 110 and a wire as illustrated in FIGURE 9. The jaws 126 and 130 are pivotally connected together by the pin 136. The first jaw 122 includes the side flanges 138 between which the second jaw 26 moves. The arms 140 and 142 are respectively adapted to be attached to an appropriate mechanical device, such as a fluid operated cylinder, or any other appropriate mechanical advantage device, for moving the jaws 122 and 126 together to wrap the respective U-shaped portions 114 and 116 about the border frame 110 and an associated integral wire adjacent the angularly offset portion 194 thereof, so as to mechanically interlock each integral wire to a border frame 110.

Other portions of each integral wire of each row of coils is secured to the border frame by clips 144.

The result, therefore, is a unique spring assembly including a plurality of rows or spring units of alternately left and right hand coils with each row comprising a single integral length of wire having each end thereof including an angularly offset portion 94 disposed adjacent a border frame 110. A clip 112 having a first portion is disposed in mechanical interlocking engagement with a border frame and a second portion is disposed about an adjacent wire and is prevented from being removed therefrom by the angularly offset portion 94. Adjacent coils of each row and adjacent rows are connected together by the helical members 34. More specifically in regard to the clips 112, a first portion 114 is wrapped about one of the wires and is prevented from being removed therefrom by the angularly offset portion 94 and a second portion 116 is wrapped about the border frame 110. The U-shaped portions 114 and 116 as illustrated in FIGURE 13 are wrapped about the border frame 110 and an adjacent wire by the jaws 122 and 126.

The foregoing, therefore, describes illustrative embodiments of novel apparatus and devices which are linked together by a novel method of manufacturing a novel spring assembly. More specifically, the novel method of manufacturing a spring assembly from at least one integral wire defining integrally connected alternate left and right hand coils comprises the steps of cutting the wire at spaced intervals therealong to provide a plurality of spring units, each of which includes integrally interconnected alternate left and right hand coils. Preferably, the ends resulting from the cutting operation are simultaneously bent to form angularly offset portions, although it will be understood that the method may be performed by independently cutting and bending each integral wire. The simultaneous bending and cutting of each wire is best illustrated in FIGURE 7. The cutting and bending operation provides a plurality of spring units comprising a plurality of rows of coils disposed in parallel side-by-side relationship. A pair of border frames are disposed about a group of spring units so that one border frame is in a plane at one extremity of the respective coils and the other border frame is at the other extremity thereof (one such border frame 110 being illustrated in FIGURE 8). Thereafter, a clip is disposed about the respective wires and about an adjacent border frame and a portion thereof is wrapped about the wire while another portion thereof is wrapped about the border frame so that the first portion of the clip is in mechanical interlocking engagement with the angularly offset portion of a wire and the second portion is in mechanical interlocking engagement with a border frame, thus providing the unique spring assembly.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of manufacturing a spring assembly from at least one integral wire defining integrally connected alternate left and right hand coils therealong, said method comprising; cutting the wire at spaced intervals therealong to provide a plurality of spring units each of which includes integrally interconnected alternate left and right hand coils interconnecting adjacent coils of each unit and adjacent units with a plurality of helical members, bending each end of the wire of each spring unit to form an angularly offset portion without lengthening the wire adjacent to said offset portion, disposing a border frame around a plurality of the spring units, wrapping a first portion of a clip about each of said wire ends and about an axis generally perpendicular to the axis of that portion of the border frame adjacent thereto so that said angularly offset portion extends from said first portion which generally surrounds the wire end to prevent disengagement of said clip from the associated wire end, and wrapping a second portion of each clip about said border frame along an axis which is generally perpendicular to the adjacent wire end so that said second portion generally surrounds said border frame completely independently of said first portion.

2. A method as set forth in claim 1 including wrapping said first and second portions of each clip in the same direction relative to the planar body thereof so that said wire ends and said border frame are on the same face of the planar body of the clips so as to be more nearly in the same plane.

3. A spring assembly comprising; a plurality of spring units each defined by one integral wire forming a plurality of alternate left and right hand coils, said spring units being disposed parallel to one another, at least one border frame extending about said spring units and disposed at one end of said coils, a plurality of helical members interconnecting adjacent coils of each spring unit and adjacent spring units, each of said wires having at least one end positioned adjacent said border frame, each of said ends having an angularly offset portion with the length of wire immediately adjacent to said offset portion being unstretched, a clip interconnecting each end and said border frame, each clip having a first portion wrapped about one of said wire ends about an axis generally perpendicular to that portion of said border frame adjacent thereto and with said offset portion extending therefrom to prevent disengagement of said clip from said wire end, each clip having a second portion wrapped about said border frame along an axis which is generally perpendicular to the adjacent wire end so that said second portion generally surrounds said border frame completely independently of said first portion.

4. An assembly as set forth in claim 3 wherein said first and second portions of each clip are integrally interconnected by a planar body and said first and second portions extend from said body in the same direction so as to be more nearly in the same plane.

References Cited

UNITED STATES PATENTS

| 947,044 | 1/1910 | Schade | 245—3 |
| 3,370,619 | 2/1968 | Docker | 140—3 |

CHARLES W. LANHAM, Primary Examiner

L. A. LARSON, Assistant Examiner

U.S. Cl. X.R.

245—3